US005443150A

United States Patent [19]

Buchko

[11] Patent Number: 5,443,150

[45] Date of Patent: Aug. 22, 1995

[54] APPARATUS FOR ADVANCING PREFORMED CONTAINERS

[75] Inventor: Raymond G. Buchko, Appleton, Wis.

[73] Assignee: Rapidpak, Inc., Appleton, Wis.

[21] Appl. No.: 125,572

[22] Filed: Sep. 23, 1993

[51] Int. Cl.[6] ..................... B65G 47/34

[52] U.S. Cl. ..................... 198/463.3; 198/463.6

[58] Field of Search ..................... 198/605, 606, 463.3, 198/463.6, 607, 575, 576

[56] References Cited

U.S. PATENT DOCUMENTS

| | | | |
|---|---|---|---|
| 2,843,248 | 7/1958 | Bofinger | 198/607 |
| 3,182,785 | 5/1965 | Tourtellotte | 198/463.3 |
| 4,124,113 | 11/1978 | Trees | 198/576 |
| 4,867,299 | 9/1989 | Fukuoka | 198/463.3 |
| 4,897,985 | 2/1990 | Buchko et al. | 53/559 |
| 5,170,611 | 12/1992 | Buchko et al. | 53/453 |
| 5,205,110 | 4/1993 | Buchko | 53/453 |

FOREIGN PATENT DOCUMENTS

| | | | |
|---|---|---|---|
| 67419 | 4/1982 | Japan | 198/607 |
| 2210843 | 6/1989 | United Kingdom | 198/607 |

*Primary Examiner*—Daniel C. Crane
*Attorney, Agent, or Firm*—Andrus, Sceales, Starke & Sawall

[57] ABSTRACT

An indexing motion apparatus and method for advancing and vacuum sealing a plurality of connected, preformed trays. The connected, preformed trays are supplied by an indexing conveyor belt assembly which delivers the preformed trays to an advancement mechanism indexingly driven by a programmable servo motor. After the preformed trays are loaded and evacuated, a flexible web of packaging material is disposed in overlying relation to the preformed trays and sealed thereto. A cutting mechanism severs the sealed, preformed trays longitudinally and transversely.

8 Claims, 4 Drawing Sheets

APPARATUS FOR ADVANCING PREFORMED CONTAINERS

BACKGROUND AND SUMMARY OF THE INVENTION

This invention relates to an indexing motion machine and method for advancing and sealing preformed containers, resulting in vacuum packaged food products or the like.

To produce discrete individual packages of food products such as frankfurters, sliced luncheon meat, cheese or the like, it has been known to employ packaging machines providing either continuous motion or indexing motion. Continuous motion machines such as disclosed in U.S. Pat. No. 4,897,985 issued Feb. 6, 1990 to Buchko, et al, typically provide a higher rate of package production than indexing machines. However, indexing machines have been in existence for a long time, and their design continues to be refined, as disclosed in U.S. Pat. No. 5,170,611 issued Dec. 15, 1992 to Buchko et al and U.S. Pat. No. 5,205,110 issued Apr. 27, 1993 to Buchko.

The present invention has as its object to provide an indexing motion package advancing and sealing machine which is capable of producing packages at a rate equivalent to or greater than the rate of which packages can be produced on a continuous-type machine. A further object of the invention is to provide an indexing motion advancing and sealing machine utilizing programmable motor controls to control the incremental movement of the various components of the package forming and advancing machine, to provide accurate positioning of the machine, and to provide variability in the package dimensions to accommodate the packaging of different products. It is a further object of the invention to provide an improved apparatus and method for supplying preformed containers to a package advancing and sealing machine.

In accordance with one aspect of the invention, an indexing motion machine for processing of preformed containers includes a preformed container supply arrangement for supplying a preformed container along a first path to an advancement mechanism associated with the machine and movable in a second path substantially parallel to the first path of the preformed container supply mechanism wherein the preformed container and the advancement mechanism are temporarily maintained stationary along the respective first and second paths. A clamping device located on the advancement mechanism clamps the preformed container as it is maintained stationary along its first path on the preformed container supply mechanism. The preformed container supply mechanism is movable along a third path from a first position in which the preformed container is disengaged from the clamping device to a second position in which the preformed container is grippingly engaged by the clamping device. A first arrangement moves the preformed container supply mechanism between the first position and the second position while a second arrangement indexingly moves the advancement mechanism and the preformed container to be processed along the machine after the preformed container has been grippingly engaged by the clamping device. In this aspect of the invention, the first arrangement for moving the preformed container between the first position and the second position comprises a pair of linear actuators operatively connected with the preformed container supply mechanism. The second arrangement for indexingly moving the advancement mechanism and the preformed container to be processed along the machine, comprises a programmable servo motor.

In accordance with another aspect of the invention, a packaging machine includes an indexing mechanism for supplying a preformed container and temporarily maintaining the preformed container stationary thereon. A movable advancement mechanism grips the preformed container as the preformed container is maintained stationary on the indexing mechanism. A loading mechanism loads the product in the preformed container and a web supply mechanism supplies a flexible web of packaging material in overlying relation to the preformed container after the preformed container has been loaded. A sealing device seals the flexible web of packaging material to the preformed container and a programmable motor means indexingly advances the preformed container from the indexing mechanism to the loading mechanism, web supply mechanism and sealing device. In this aspect of the invention, the advancement mechanism comprises a pair of spaced apart chains providing a plurality of clamping jaws for gripping the edges of the preformed container. A packaging machine also contemplates an actuating mechanism which is enagageable and disengageable with the clamping jaws to control the opening and closing thereof. The sealing device includes a separate programmable motor for moving the sealing device between a first position at which a sealing bar is engageable with the flexible web of packaging material and the preformed container and a second position at which the sealing bar is disengageable with the flexible web of packaging material and the preformed container.

In accordance with yet another aspect of the invention, a method of advancing a preformed container in a packaging apparatus comprises the steps of supplying a preformed container along a first path, temporarily holding the preformed container along the first path, moving the preformed container along a second path to a movable gripping mechanism while the preformed container is temporarily held along the first path, selectively actuating the gripping mechanism so that the preformed container is movable with the gripping mechanism and indexingly driving the gripping mechanism along the packaging apparatus by means of a programmable motor whereby the motor temporarily functions to maintain the gripping mechanism stationary while the preformed container is temporarily held along the first path.

In accordance with yet another aspect of the invention, a machine for advancing a plurality of connected preformed containers having longitudinal edges comprises a conveyor mechanism located at one end of a framework for supplying a plurality of connected preformed containers along a first path. A movable gate device is operatively connected with the conveyor mechanism for temporarily holding and subsequently releasing the preformed containers along the first path. A linear actuator mechanism is operatively connected with the conveyor mechanism for moving the preformed containers along a second path while the preformed containers are temporarily held along the first path. A movable advancement device extends along the framework for gripping the preformed containers as the preformed containers are temporarily held along the first path. The advancement mechanism includes clamping jaws for grippingly engaging the longitudinal edges of the preformed containers along the top and bottom of the longitudinal edges. An actuating bar device is positioned adjacent the clamping jaws for selectively opening and closing the clamping jaws upon the longitudinal edges of the preformed containers as the preformed containers are temporarily held along the first path. A programmable motor means indexingly drives the movable advancement mechanism and preformed containers along the framework after the gate device has released the preformed containers.

In accordance with yet another aspect of the invention, a packaging machine for sealing a plurality of connected preformed containers includes a bi-directional indexing mechanism for supplying a plurality of connected preformed containers and temporarily maintaining the preformed containers stationary thereon. A linear motor mechanism is operatively connected to the indexing mechanism for moving the indexing mechanism along one direction. A movable advancement mechanism grips the preformed containers as the preformed containers are maintained stationary on the indexing mechanism. After a loading mechanism has loaded a product into the preformed containers, a web supply mechanism supplies a flexible web of packaging material in overlying relation to the preformed containers. A sealing device seals the flexible web of packaging material to the preformed containers while a vacuum device evacuates the preformed containers and a cutting device severs the sealed preformed containers. A first programmable motor controls the sealing device and the vacuum device and a second programmable motor indexingly advances the preformed containers from the indexing mechanism to the loading mechanism, to the web supply mechanism, to the sealing device, to the vacuum device and to the cutting device.

Various other features, objects and advantages of the invention will become apparent from consideration of the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
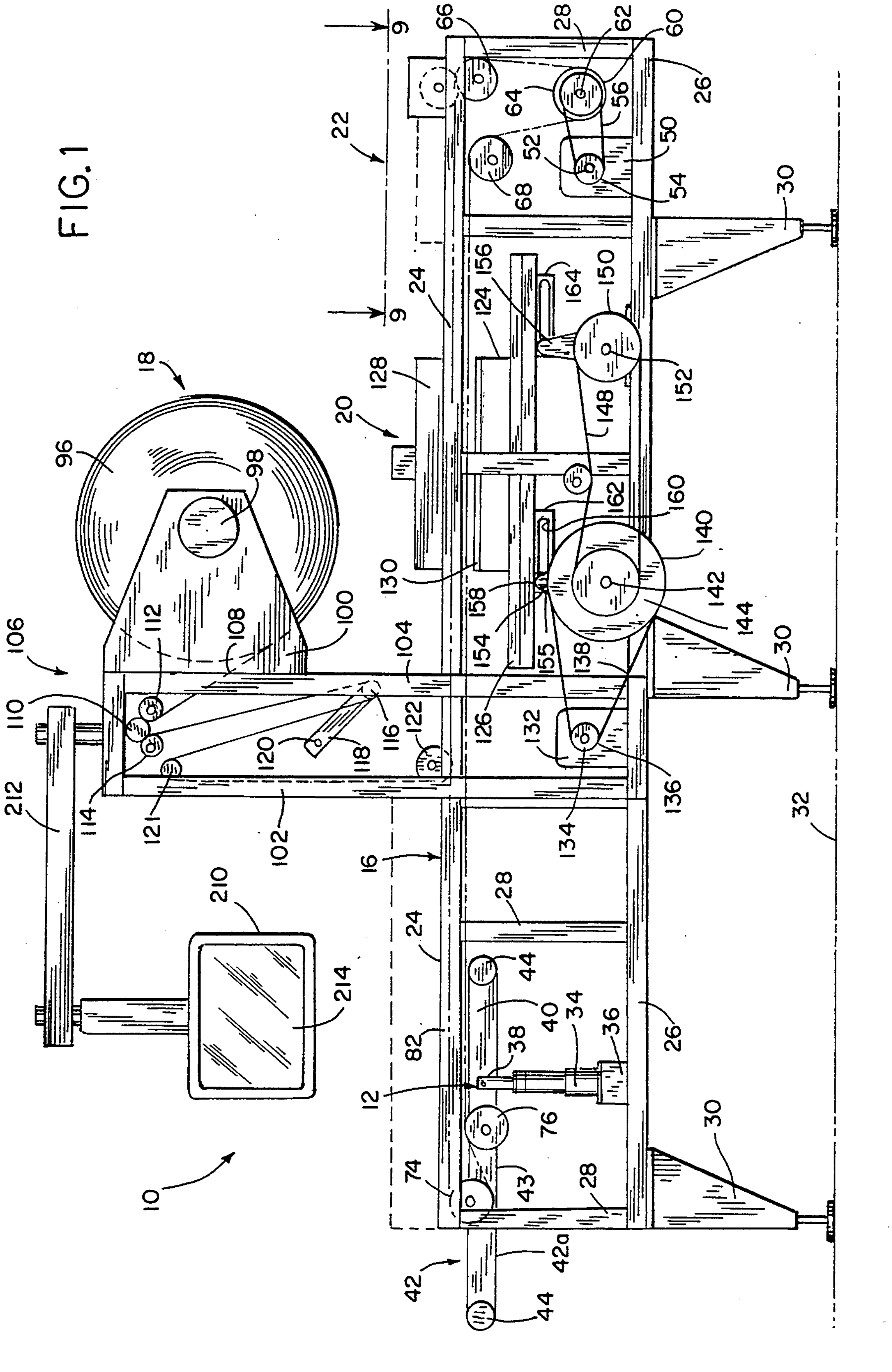
FIG. 1 is a side elevation view of a packaging machine incorporating the principles of the present invention.

Referring now to the drawings, there is shown an embodiment of an indexing motion advancing and packaging machine incorporating the principles of the present invention. The package formed by the packaging machine of the present invention is a sealed and evacuated packet or container which contains a quantity of product. It is preferably formed of a separate plastic laminate film, which is joined to partially surround a preformed tray filled with a product. The packaging machine is adaptable to package any preformed container for which evacuated plastic film packaging is desirable. The number and shape of preformed trays or other containers being indexingly sealed and the shape of the film for sealing the preformed tray is also optional, depending upon the packaging objective. These various alternatives are all within the scope of the invention.

Figure 2:
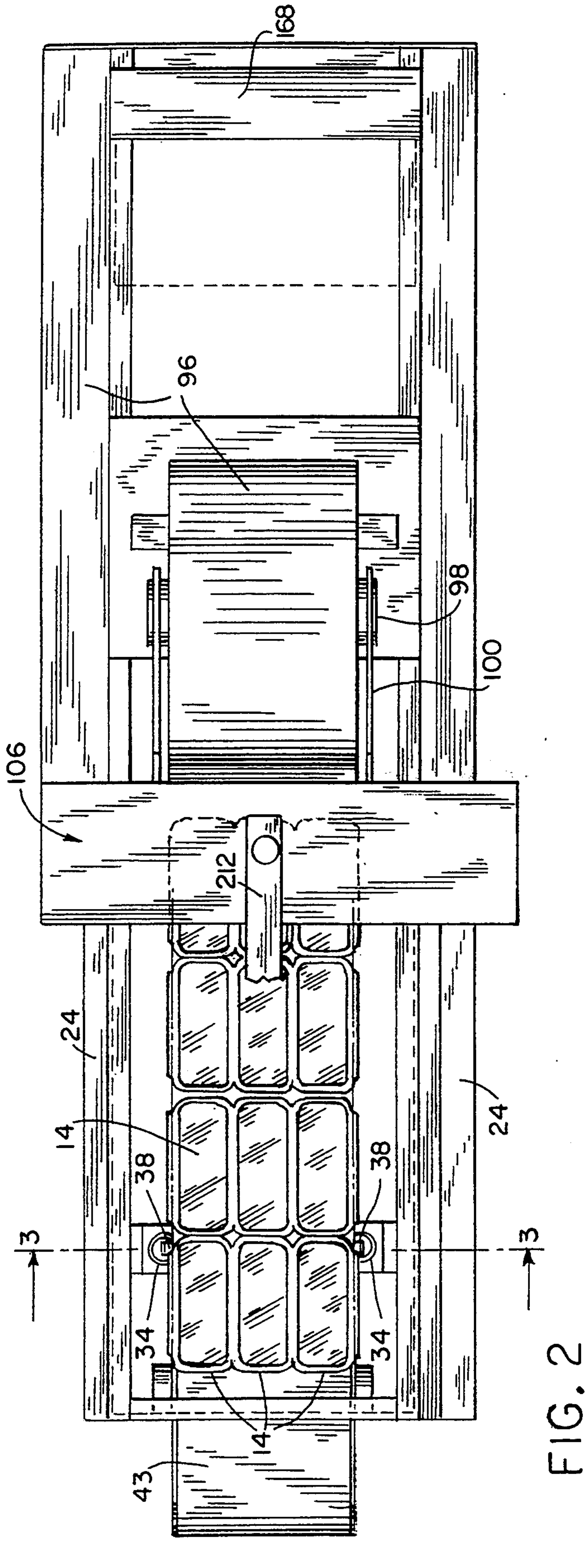
FIG. 2 is a fragmentary, top view of the packaging machine of FIG. 1.

FIGS. 1 and 2 illustrate a packaging machine 10 constructed according to the invention. Packaging machine 10 generally includes a conveyor supplying station 12 for supplying preformed trays 14 of flexible packaging material joined side by side, a loading station 16, an upper web supply station 18 for supplying an upper web of flexible packaging material from a supply roll for sealing the preformed trays 14, an evacuation and sealing station 20, and a cutting station 22 for severing the sealed preformed trays 14.

The machine 10 is categorized as an indexing motion packaging machine for advancing and sealing preformed containers, preferably trays. Indexing motion means that the preformed trays are moved incrementally along a path in which the preformed trays are loaded, sealed, evacuated and severed. A single web disposed in overlying relation to the preformed tray is used to seal and form the package after a product is delivered to the preformed tray.

The various components of packaging machine 10 are mounted to and supported by a frame assembly (FIG. 1) including a pair of spaced, parallel upper frame members 24, lower spaced frame members such as shown at 26, and a series of vertical frame members 28 extending between upper frame members 24 and lower frame members 26. A series of legs 30 are provided for supporting machine 10 above a floor 32.

Figure 6:
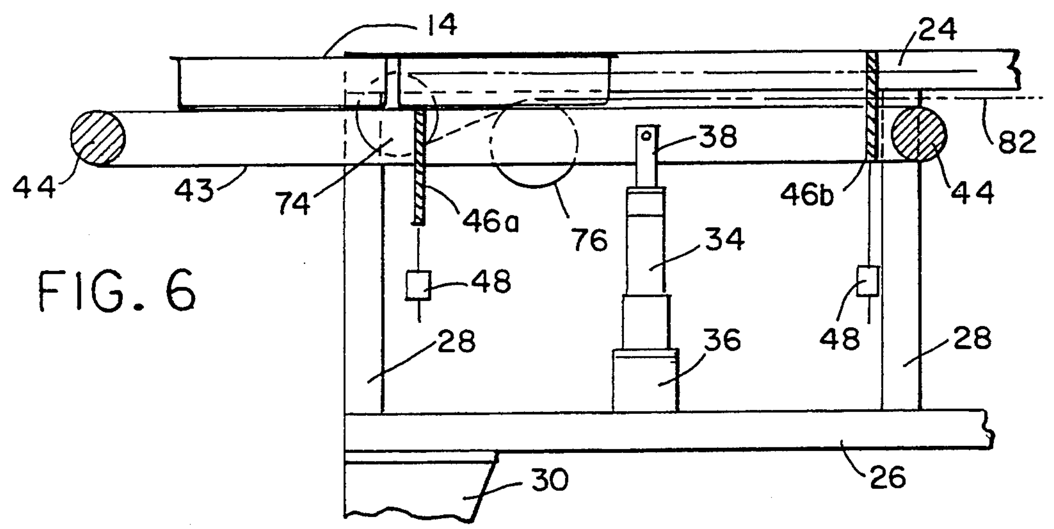
FIGS. 6–8 are fragmentary, side elevation views of a vertically movable conveyor for transporting preformed trays.
Figure 7:
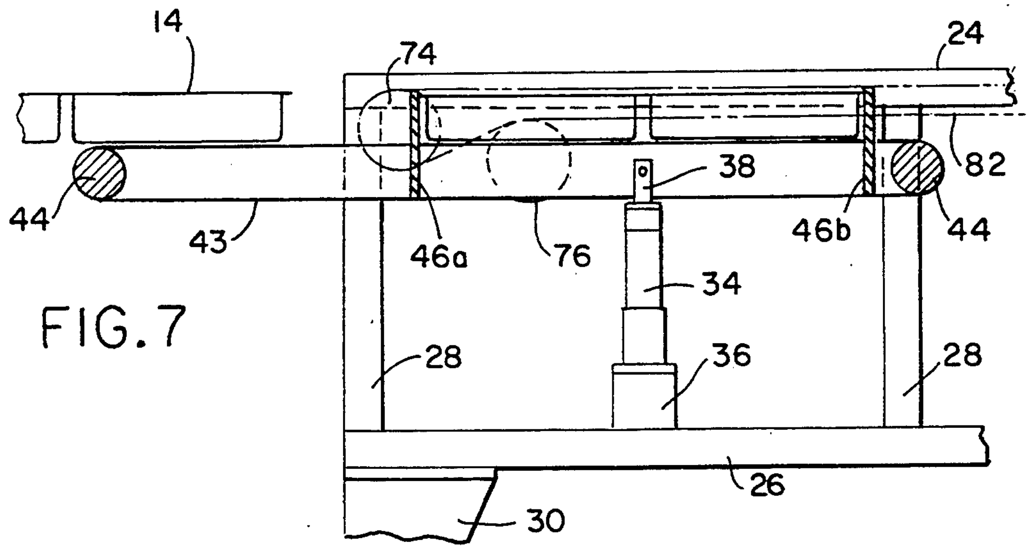
Figure 8:
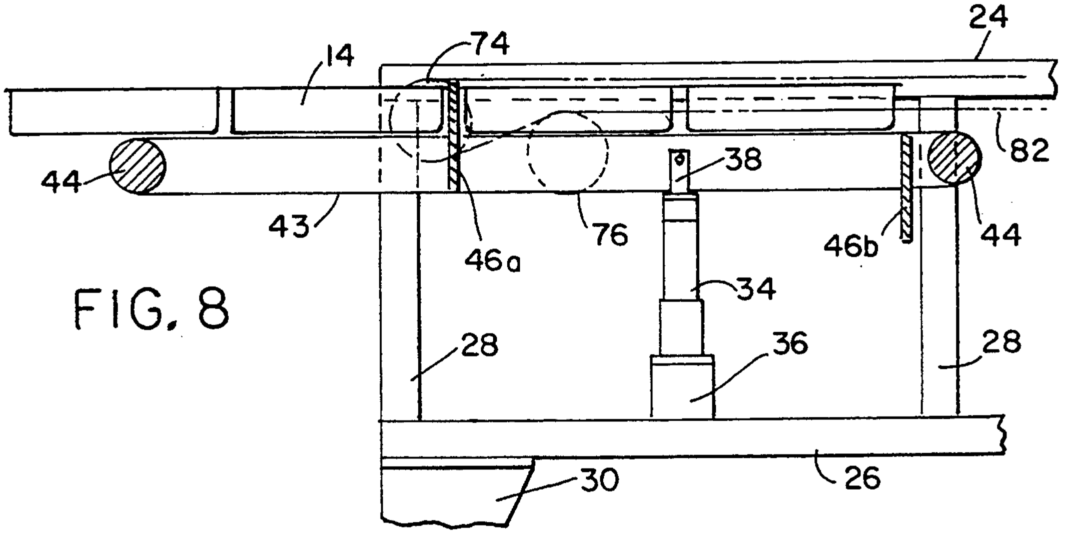

Conveyor supplying station 12 suitably comprises a pair of telescopic linear actuators 34, each having a cylinder end 36 mounted on lower frame member 26 and a rod end 38 extendable and retractable with respect to cylinder end 36. The top of each rod end 38 is rigidly connected to a side rail 40 of a conveyor belt assembly 42 having a ribbed endless belt 43 selectively driven around end rollers 44. Conveyor belt assembly 42 extends generally parallel and directly beneath upper frame members 24, including a short portion 42*a* which projects beyond the upstream end of machine 10. Assembly 42 is selectively indexed upwardly and downwardly with respect to upper frame members 24 by linear actuators 34. As seen in FIGS. 6–8, packaging machine 10 includes a pair of vertically movable stop gates 46 which are selectively actuable relative to conveyor belt assembly 42 by means of linear actuators 48, to control the continued transport of preformed trays 14 along packaging machine 10, as will be explained in greater detail hereafter.

In order to advance preformed trays 14, an indexing drive servo motor 50 is mounted to lower frame members 26 and includes an output shaft 52 to which a timing pulley 54 is mounted. A timing belt 56 is trained around timing pulley 58 and also around a driven timing pulley 60 mounted to a driven shaft 62. Driven shaft 62 is rotatably supported between the sides of the frame of packaging machine 10. Also mounted on both ends of driven shaft 62 is a sprocket 64. Similar sprockets 66, 68 are joined on the ends of shafts 70, 72 rotatably supported between the sides of the frame of packaging machine 10 beneath cutting station 22. Further, at the other end of machine 10, sprockets 74, 76 are rotatably supported on the ends of shafts 78, 80 extending between the sides of the frame of packaging machine 10 adjacent conveyor supplying station 12. A chain 82 is provided on each side of packaging machine 10 and is entrained around sprockets 64, 66, 68, 74, 76.

Figure 3:
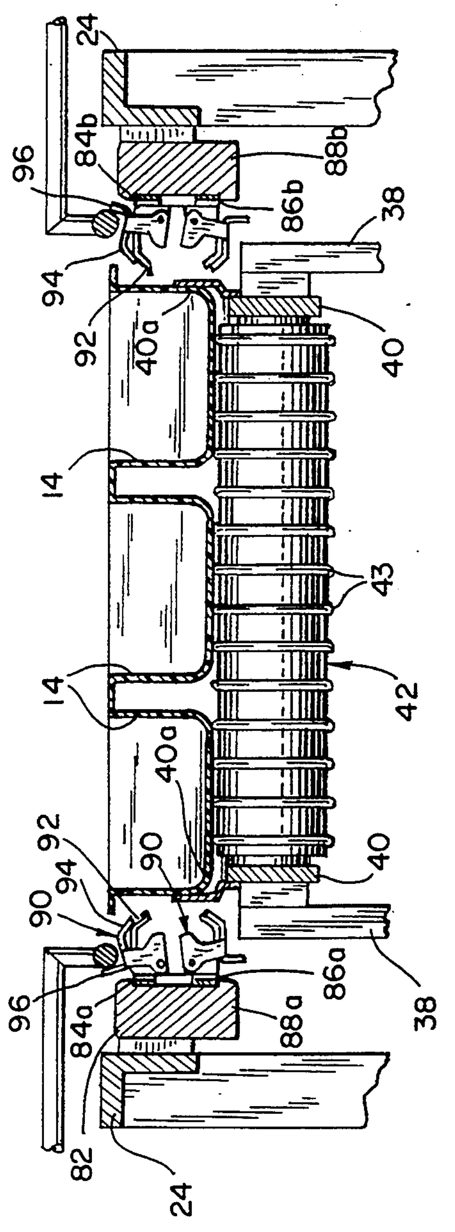
FIG. 3 is a cross-sectional view taken on line 3—3 of FIG. 2.

As seen in FIG. 3, each chain 82 provides upper runs *84a, 84b* and lower runs *86a, 86b* which are mounted on blocks *88a, 88b* located on either side of the frame of packaging machine 10. Blocks *88a, 88b* are mounted to upper frame members 24 and enable sliding movement of chain runs 82 along the length of packaging machine 10. Each of upper and lower runs *84a, 84b, 86a, 86b* is provided with a set of closely spaced, tray clamps 90 for receiving and carrying the edges of preformed trays 14 along packaging machine 14. Clamps 90 include a stationary lower jaw 92 carried by chain runs *84a, 84b*. Upper jaw 94 is pivotally attached to lower jaw 92. Jaws 92, 94 each include gripper teeth, and upper jaw 94 is biased into a closed gripping relationship toward lower jaw 92 by a spring (not shown). Upper jaws 94 include an operator lever 96 to pivot each jaw 94 relative to lower jaw 92 to open the teeth to receive an edge of a preformed tray 14. An actuator bar 98 is provided on each side of machine 10 and is actuated by a linear actuator (not shown) to move bar 98 back and forth into and out of engagement with operator lever 96 to control relative movement between jaws 92, 94 at a predetermined time and location. By this arrangement, intermittent operation of servo motor 50 provides indexing movement of chains 82 and their respective clamps 90 to indexingly advance preformed trays 14 along the edges thereof through packaging machine 10.

After preformed trays 14 have been gripped by jaws 92, 94, preformed trays 14, which are joined side by side, are advanced to loading station 16 where products are loaded into trays 14 in any satisfactory manner such as by hand or an automated loading system. Products are typically foodstuffs such as ham, bacon, hot dogs, cheese, luncheon meat and the like. Once the preformed trays 14 are loaded, trays 14 are indexingly transported to upper web supply station 18.

Upper web supply station 18 functions to supply a plastic laminate seal which is disposed over and partially around each preformed tray 14. An upper web supply roll 96 is rotatably supported on a shaft 98 rotatably mounted to a bracket assembly 100. A pair of vertical frame members 102, 104 extend upwardly from upper frame members 24 of machine 10 for supporting upper web supply station 18.

An unwinding drive assembly, shown generally at 106, is mounted to the frame of upper web supply station 18 for unwinding upper web material 108 from supply roll 96. The components of unwinding drive assembly 106 include a rubber surfaced nip roller 110, which rests on top of driven rollers 112, 114 forming a pair of nips between roller 110 and rollers 112, 114. Upper web 108 is fed below driven roller 112, up and over nip roller 110 and below driven roller 114. Upon operation of a motor (not shown), drive rollers 112, 114 are driven and upper web 108 is unwound from supply roll 96 by rotation of driven rollers 112, 114 and nip roller 110.

From driven roller 114, upper web 108 is trained around a dancer roller 116 rotatably mounted to a dancer arm 118 which is pivotably supported at its upper end by shaft 120 extending between the sides of the machine frame. As noted previously, and as will be explained in greater detail, upper web 108 is advanced through machine 10 in an indexing fashion. The dancer assembly, consisting of dancer roller 116 and dancer arm 118, acts as an actuator for switching the motor on and off and controlling its speed of operation for providing unwinding of upper web 108 from supply roll 96 in response to indexing movement of preformed trays 14 through stations downstream of the dancer assembly.

As more fully explained in U.S. Pat. No. 5,205,110, dancer arm 118 pivots counter-clockwise to bring an actuator member into proximity with a switch which causes the motor to operate. As the supply of upper web 108 catches up with indexing movement of the preformed trays 14, dancer arm 118 pivots about shaft 120 in a clockwise direction, which causes an attendant slowdown in the motor. Dancer arm 118 thus moves back and forth in an arcuate manner as long as its actuator member remains in proximity to its proximity switch during indexing of preformed trays 14.

From dancer roller 116, upper web 108 is trained over a steel roller 121, runs downwardly along vertical frame member 102, and around a roller 122 after which upper web 108 is disposed in overlying relationship to preformed trays 14 being indexed along machine 10. Evacuating and sealing station 20 is located immediately upstream from upper web supply station 18. Station 20 includes a vacuum box 124 which is mounted to a movable frame assembly 126 and is operable with known vacuum packaging principles to evacuate the product cavity in preformed trays 14 while the preformed trays 14 are being sealed with upper web 108. A heating assembly 128 is located above upper frame member 24 to impart flexibility to upper web 108 prior to being sealed on preformed trays 14. Movable frame assembly 126 also includes a suitable sealing bar mechanism 130 for joining upper web 108 to preformed trays 14. Frame 126 is movable between a raised position at which evacuation and sealing occurs, and a lowered position wherein the sealed and evacuated preformed trays 14 advance upstream.

In order to move frame 126 upwardly and downwardly, a servo motor 132 is mounted to lower frame members 26 and includes an output shaft 134 to which a drive timing pulley 136 is mounted. A timing belt 138 is trained around drive pulley 136 and a large driven pulley 140 which is mounted to a shaft 142 rotatably mounted between lower frame members 26. A smaller diameter lift pulley 144 is connected to shaft 142 on the outside surface of large timing pulley 140, and a timing belt 148 is entrained about outside mounted pulley 144 and around a second lift pulley 150. Pulley 150 is keyed to a shaft 152 which is rotatably mounted to lower frame members 26. With this arrangement, a pair of lift pulleys 144, 150 are rotatable in response to operation of servo motor 132.

A pair of lift arms 154, 156 are mounted to lift pulleys 144, 150. Lift arms 154, 156 are fixed at their lower ends to shafts 142, 152, respectively, and are therefore pivotable with shafts 142, 152 in response to operation of lift servo motor 132.

As shown in FIG. 1, lift arm 154 is provided with an upwardly extending shaft 155 to which is mounted a roller member 158. Roller member 158 is mounted within cam slot 160 formed in a cam member 162 which is connected to the underside of frame 126. With this arrangement, upon reciprocating clockwise and counter-clockwise movement of shaft 156 resulting from reciprocating motion of lift servo motor 132, roller member 158 is caused to move back and forth in cam slot 160 to raise and lower frame 126 to which vacuum box 124 is mounted. A cam member 164 is mounted to the forward portion of frame 126 and includes a cam slot similar to slot 160 formed in rearward cam member 162. Lift arm 156 is provided with a roller arrangement similar to that described for arm 154. Timing belt 148 trained around lift pulleys 144, 150 provides simultaneous lifting and lowering of lift arms 154, 156 and frame 126. In a preferred arrangement, a pair of rearward cam members 162 are mounted one on either side of the rearward portion of frame 126 and a pair of rearward lift arms 154 are connected to shaft 155. Similarly, a pair of forward cam members 164 are mounted one on either side of the forward portion of frame 126, and a pair of forward lift arms 156 are mounted to shaft 152.

Figure 9:
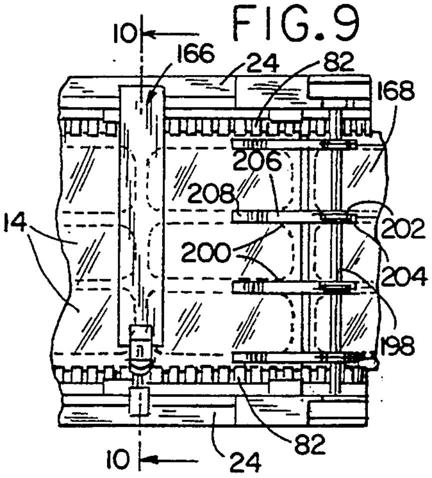
FIG. 9 is a fragmentary, top view of a cross cutting and slitting arrangement of the packaging machine taken on line 9—9 of FIG. 1.
Figure 10:
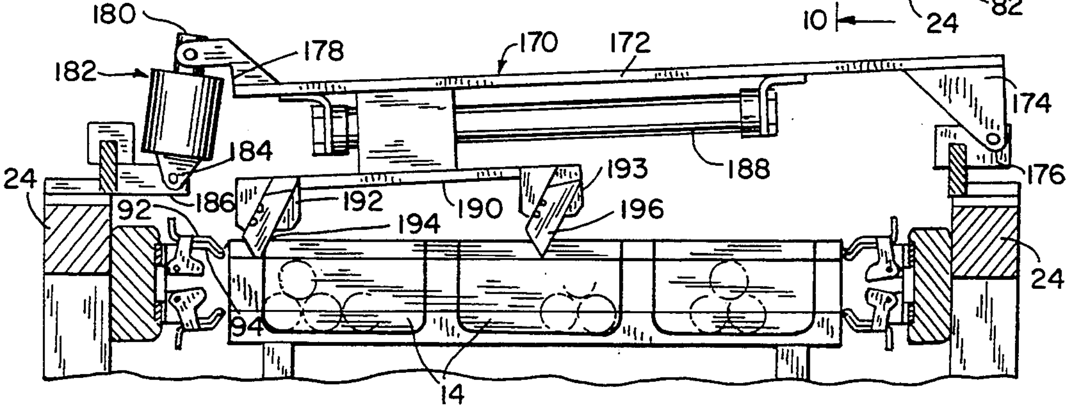
FIG. 10 is a fragmentary, cross-sectional view of the cross cutting arrangement taken on line 10—10 of FIG. 9.

After the product cavities in trays 14 are evacuated and upper web 108 is sealed collectively upon trays 14, the connected packaged trays 14 are advanced to cutting station 22. As shown in FIGS. 9 and 10, a cross cut mechanism 166 severs the sealed trays 14 transversely while a slitting mechanism 168 thereafter cuts the sealed trays 14 longitudinally to separate the lanes of sealed trays 14.

Cross cut mechanism 166 includes a frame assembly 170 including an upper frame member 172 and a bracket member 174, which is pivotably mounted to a support member 176 mounted to upper frame member 24 of packaging machine 10. A bracket member 178 is located at the other end of upper frame member 24, and is connected to the extendable and retractable output member 180 of a cylinder assembly shown generally at 182. A bracket 184 connects the lower end of cylinder assembly 182 to a support member 186, which is interconnected with frame member 24 of packaging machine 10.

Cylinder assembly 182 may be any satisfactory assembly for raising and lowering output member 180 such as a pneumatic or hydraulic cylinder, or a solenoid-type arrangement. With this construction, upper frame member 172 is movable between a lowered position, and a raised position.

A rodless hydraulic cylinder 188 is mounted to the underside of upper frame member 172, and a carriage 190 is connected to the movable output member of rodless cylinder 188. A pair of blade holder assemblies 192, 193 are mounted to the ends of carriage 190 and retain a pair of knife blades 194, 196.

Operation of rodless cylinder 188 provides a cutting stroke to carriage 190 for drawing blades 194, 196 rightwardly through sealed trays 14 to transversely sever sealed trays 14. The output member of rodless cylinder 188 is first moved to its leftward-most position so that blade 194 is disposed leftwardly of the leftward edges of sealed tray 14, and blade 196 is located in the area between the lanes of the sealed packages. Output member 180 of cylinder assembly 182 is then retracted, so that the points of blades 194, 196 pierce sealed trays 14. Rodless cylinder 188 is then operated to move carriage 190 rightwardly and blades 194, 196 cut through sealed trays 14 to completely sever sealed trays 14. Upon a full cutting stroke of rodless cylinder 188, blade 194 is moved rightwardly an amount sufficient to sever trays 14 up to the point where blade 196 initially pierced the trays 14. Blade 196 is moved completely through the trays 14 to clear their rightward edges. Output member 180 of cylinder 182 is then extended to raise blades 194, 196 above trays 14, and output member 180 of rodless cylinder 182 is moved leftwardly to bring blades 194, 196 back to their original position, whereafter output member 180 is again retracted to bring blades 194, 196 into contact with trays 14.

Blades 194, 196 are conventional blades as used in a utility knife or the like, and therefore are relatively inexpensive and readily available. This reduces an operator's cost, since blades must often be replaced during operation of packaging machine 10.

Blade holder assemblies 192, 193 are constructed so as to provide quick and easy interchangeability of blades 194, 196, thus minimizing downtime of packaging machine 10 for blade replacement.

Downstream of cross cutting mechanism 166 is located longitudinal slitting mechanism 168 for slitting the transversely cut sealed trays 14. Slitting mechanism 168 includes a rotating bar 198 having a series of slitters 200 mounted thereto. Each slitter 200 consists of a hub 202 and a blade 204. A series of slitter blocks 206 are mounted below slitting mechanism 168 and each includes a groove within which slitting blade 204 is located. Slitting blocks 206 are narrow enough to fit between the sealed trays 14 and each includes a sloping lead surface 208. After cross cut mechanism 166 transversely severs sealed trays 14, slitter blades 204 longitudinally sever sealed trays 14 into discrete product packages. The outer portion of severed sealed trays 14 is retained in the clamping jaws 92, 94 and is eventually discharged therefrom and discarded as waste.

In operation, a series of connected preformed trays 14 are first manually or automatically supplied on the extended portion 42*a* of conveyor belt assembly 42. In the preferred embodiment, preformed trays 14 are joined together in two transverse rows, each row having three trays 14 joined together side by side as seen in FIGS. 2 and 3. Trays 14 are prevented from lateral shifting by guide brackets 40*a* provided on each side of conveyor side rail 40 while ribbed conveyor belt 43 promotes a smooth, positive transfer of trays 14.

Figure 4:
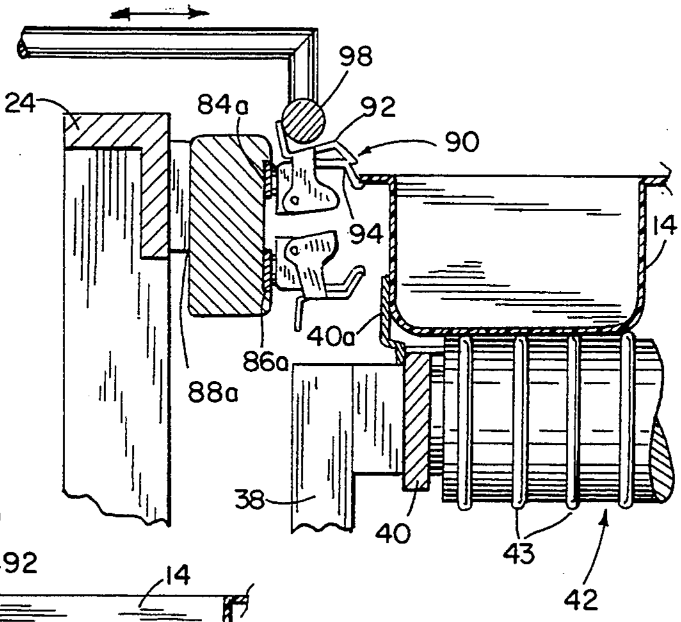
FIG. 4 is a fragmentary, cross-sectional view similar to FIG. 3 showing a preformed tray in a staging. position.
Figure 5:
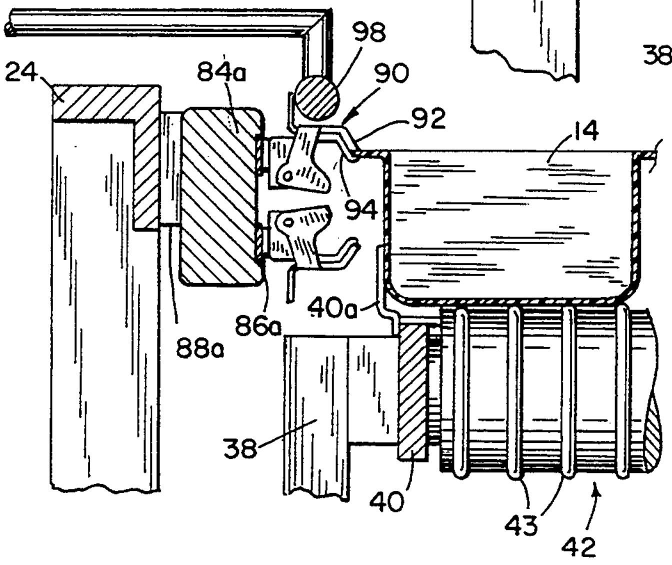
FIG. 5 is a fragmentary, cross-sectional view similar to FIG. 3 showing a preformed tray in a clamped position.

As a salient feature of the invention, conveyor supplying station 12 indexes preformed trays 14 to a specific position at which the longitudinal edges of preformed trays 14 are gripped by jaws 92, 94 of tray clamps 90 on chains 82. Referring now to FIGS. 3 and 6, joined, preformed trays 14 are initially conveyed along moving conveyor belt 42, which is raised by actuators 34 with gate 46*a* retracted and gate 46*b* extended (FIG. 6). During this phase, jaws 92, 94 remain completely out of contact with preformed trays 14. When preformed trays 14 reach gate 46*b*, gate 46*a* is extended (FIG. 7) and preformed trays 14 are temporarily maintained stationary, or unchanging in position, along with chains 82. At that point, actuators 34 are retracted to lower preformed trays 14 into a staying position (FIG. 4) in which actuator bar 98 is pulled outwardly toward upper frame member 24 to engage operator levers 96 and pivot upper jaws 94 open such that the bottom of the longitudinal edges of preformed trays 14 can be set down upon lower jaws 92. Immediately thereafter, actuating bar 98 is moved to the right (FIG. 5) so that upper jaws 94 can spring down upon the top of longitudinal edges of preformed trays 14 to create a clamping position. After jaws 92, 94 have grippingly engaged the longitudinal edges of preformed trays 14, gate **46*b* is lowered (FIG. 8) so that preformed trays may be indexingly advanced by moving chains 82 and jaws 92, 94 to loading station 16, upper web supply station 18, evacuating and sealing station 20 and cutting station 22**.

Referring again to FIG. 1, a control module 210 is mounted to an arm 212 which is pivotably connected to the upper end of the frame of upper web supply station 18. Control module 210 can be moved to various positions by the operator of machine 10, who is normally positioned at loading station 16. Control module 210 includes a touch screen 214 for controlling, inter alia, the proper timing and operation of servo motors 132, 150, linear actuators 34, actuator 182 and rodless cylinder 188. In accordance with known technology, the operation of servo motors is controlled by programmable controllers, thereby providing very fine control of the position of the servo motor output shafts and thereby of the packaging machine driven by the servo motors. The servo motors are programmed so as to provide smooth and even acceleration and deceleration of the driven components and rapid intermediate movement for moving the components from one position to another. In this manner, the servo driven components of packaging machine 10 can be operated at a very high rate of speed, providing dramatically increased rate of package production over conventional indexing-type preformed tray packaging machines.

Another advantage offered by the use of servo motors in machine 10 is that the operating parameters can be varied by changing the program which controls the operation of the servo motors. The operating parameters are varied by use of the operator interactive touch screen 214. For example, chains 82 lengthen slightly over time due to wear of the links. With the present invention, this problem is addressed by changing the operating parameters to appropriately alter the length of the incrementing movement.

It should be appreciated that the present invention provides a versatile indexing mechanism for supplying and advancing preformed containers of various size and arrays to a packaging machine. This is a marked improvement over prior art packaging machines for preformed containers requiring discretely-sized container carriers which must be changed for different runs in sealing variously-sized preformed containers.

Various alternatives and embodiments are contemplated as being within the scope of the following, particularly pointing out and distinctly claiming the subject matter regarded as the invention.

What is claimed is:

1. An indexing motion machine for processing a preformed container, said machine comprising:

preformed container supply means for supplying a preformed container along a first path to an advancement mechanism associated with the machine, and movable in a second path substantially parallel to the first path of the preformed container supply means wherein the preformed container and the advancement mechanism are temporarily maintained stationary along their respective first and second paths;

movable gate means movable into and out of engagement with the preformed container and operatively associated with and separate from the preformed container supply means for controlling the transport of the preformed containers along the first path;

clamping means located on the advancement mechanism for clamping the preformed container as it is maintained stationary along its first path on the preformed container supply means, the preformed container supply means being movable along a third path from a first position in which the preformed container is disengaged from the clamping means to a second position in which the preformed container is grippingly engaged by the clamping means;

first means for moving the preformed container supply means between the first position and the second position; and second means for indexingly moving the advancement mechanism and the preformed container to be processed along the machine after the preformed container has been grippingly engaged by the clamping means.

2. The machine of claim 1, wherein the preformed container supply means comprises an endless conveyor belt assembly.

3. The machine of claim 1, wherein the first means for moving the preformed container between the first position and the second position comprises a pair of linear actuators operatively connected with the preformed container supply means.

4. The machine of claim 1, wherein the second means for indexingly moving the advancement mechanism and the preformed container to be processed along the machine comprises a programmable servo motor.

5. A machine for advancing a plurality of connected, preformed containers having top and bottom longitudinal edges, said machine comprising:

a framework;

a conveyor means located at one end of the framework for supplying a plurality of connected, preformed containers along a first path;

movable gate means movable into and out of engagement with the preformed containers and operatively connected with and separate from the conveyor means for temporarily holding and subsequently releasing the preformed containers along the first path;

linear actuator means operatively connected with the conveyor means to move the conveyor means for moving the preformed containers along a second path while the preformed containers are temporarily held along the first path;

movable advancement means extending along the framework for gripping the preformed containers as the preformed containers are temporarily held along the first path, said advancement mechanism including clamping jaws for grippingly engaging the longitudinal edges of the preformed containers along the top and bottom of the longitudinal edges;

actuating bar means adjacent the clamping jaws for selectively opening and closing the clamping jaws upon the longitudinal edges of the preformed containers as the preformed containers are temporarily held along the first path; and programmable motor means for indexingly driving the movable advancement means and preformed containers along the framework after the gate means has released the preformed containers.

6. The machine of claim 5, wherein the clamping jaws comprise an upper jaw and a lower jaw, the upper jaw being pivotally attached to the lower jaw and the upper jaw including an operator lever selectively engageable and disengageable with the actuating bar means.

7. The machine of claim 5, wherein the conveyor means includes guide brackets for preventing lateral shifting of the preformed containers upon the conveyor means.

8. The machine of claim 6, wherein the bottom of the longitudinal edge of the preformed containers is locatable upon the lower jaw responsive to the actuating bar means engaging the upper jaw and the top of the longitudinal edge of the preformed containers is subsequently engageable by the upper jaw responsive to the actuating bar means disengaging from the upper jaw.

* * * * *